US012421891B1

(12) United States Patent
Yu

(10) Patent No.: US 12,421,891 B1
(45) Date of Patent: Sep. 23, 2025

(54) HIGH-SPEED LONG-STROKE RECIPROCATING ENGINE

(71) Applicant: SAUDI ARABIAN OIL COMPANY, Dhahran (SA)

(72) Inventor: Xin Yu, Novi, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/821,400

(22) Filed: Aug. 30, 2024

(51) Int. Cl.
*F02B 75/18* (2006.01)
*F01B 1/04* (2006.01)
*F01B 9/02* (2006.01)
*F02B 75/22* (2006.01)

(52) U.S. Cl.
CPC .............. *F02B 75/225* (2013.01); *F01B 1/04* (2013.01); *F01B 9/02* (2013.01)

(58) Field of Classification Search
CPC ..... F02B 75/225; F02B 75/282; F02B 75/228
USPC .......................................................... 123/52.1
See application file for complete search history.

(56) References Cited

U.S. PATENT DOCUMENTS 1,406,319 A * 2/1922 Wygodsky .............. F01L 13/00 91/181
2,137,941 A * 11/1938 Helmore ................... F01B 7/14 123/55.4
2,748,757 A * 6/1956 Morris .................... F02B 25/00 123/294
4,129,102 A * 12/1978 van der Lely ........ F01B 3/0005 123/56.6
4,494,442 A * 1/1985 Fishel ..................... F01L 19/00 91/181
4,876,992 A * 10/1989 Sobotowski .......... F02B 75/225 123/59.6
5,477,818 A * 12/1995 Ascari ................... F02F 1/4214 123/51 AA
5,758,610 A 6/1998 Park
6,199,369 B1 * 3/2001 Meyer ................... F02B 75/225 60/39.6
7,156,056 B2 1/2007 Lemke et al.
7,270,108 B2 9/2007 Lemke
7,584,724 B2 9/2009 Berger
(Continued)

FOREIGN PATENT DOCUMENTS

DE 392928 C 3/1924
GB 681849 A 10/1952

*Primary Examiner* — Logan M Kraft
*Assistant Examiner* — James J Kim
(74) *Attorney, Agent, or Firm* — Osha Bergman Watanabe & Burton LLP

(57) ABSTRACT

An engine includes a first crankshaft and a second crankshaft, pistons, piston rods, cylinders, combustion chambers, and fuel injectors. The crankshafts each extend in a horizontal plane and form a first and second rotating power output shaft of the engine. The combustion chambers form containment boundaries for combustion reactions of an air-fuel mixture formed in the cylinders with fuel provided by the fuel injectors. The piston rods connect the pistons to the first or the second crankshaft. The pistons are disposed in the cylinders, and the planar surface of the piston head of each piston distributes forces from an associated combustion reaction to a corresponding piston rod. The piston heads are disposed at an angle between 7 and 15 degrees in the first bank of cylinders and −7 and −15 degrees in the second bank of cylinders relative to a vertical plane.

16 Claims, 6 Drawing Sheets

(56) References Cited

U.S. PATENT DOCUMENTS

| | | | | |
|---|---|---|---|---|
| 8,365,697 | B2 | 2/2013 | Cleeves | |
| 9,243,578 | B2 | 1/2016 | Cleeves et al. | |
| 10,830,169 | B1 * | 11/2020 | Banker | F02D 13/06 |
| 11,085,297 | B1 * | 8/2021 | Warren | F01L 1/026 |
| 2007/0039572 | A1 | 2/2007 | Lemke et al. | |
| 2007/0215093 | A1 | 9/2007 | Lemke et al. | |
| 2007/0245892 | A1 | 10/2007 | Lemke et al. | |
| 2010/0186723 | A1 | 7/2010 | Lemke et al. | |
| 2012/0085302 | A1 | 4/2012 | Cleeves | |
| 2013/0146013 | A1 | 6/2013 | Cleeves | |
| 2013/0220279 | A1 | 8/2013 | Cleeves | |
| 2014/0102418 | A1 * | 4/2014 | Babu | F02B 75/282 123/51 R |
| 2017/0159614 | A1 * | 6/2017 | Miller | F02M 26/08 |
| 2023/0044154 | A1 | 2/2023 | Naber | |
| 2024/0044284 | A1 * | 2/2024 | Collett | F02B 33/44 |

* cited by examiner

| Angle (deg) | Cylinder Diameter (mm) | Stroke (mm) | SurfaceArea (mm^2) | Clearance Volume (mm^3) | Displacement Volume(L) | CR | Dual Piston S/V Ratio (mm^-1) | Maximum Engine Speed with Limited Mean Piston Speed (25 m/s) |
|---|---|---|---|---|---|---|---|---|
| 10 | 79.0 | 79.0 | 13225.0 | 67584.0 | 0.8 | 12.5 | 0.2 | 9493.7 |
| 7 | 79.0 | 79.0 | 12369.0 | 50688.0 | 0.8 | 16.3 | 0.2 | 9493.7 |
| 15 | 79.0 | 79.0 | 14936.0 | 101377.0 | 0.8 | 8.6 | 0.1 | 9493.7 |
| 5 | 79.0 | 79.0 | 11514.0 | 33792.0 | 0.8 | 23.9 | 0.3 | 9493.7 |

FIG. 5

HIGH-SPEED LONG-STROKE RECIPROCATING ENGINE

BACKGROUND

The maximum stroke of traditional internal combustion engines is limited by the mean engine speed and acceleration due to excessive piston, piston rod, and crank stress during high-speed operations. Because of this, internal combustion engines are typically designed with either a large crankshaft pulley radius and a small cylinder radius for high efficiency, or a small crankshaft pulley radius and a large cylinder radius for high peak power if engine displacement is constrained. Designs with a large crankshaft pulley radius tend to result in increased stress on the components due to high engine speeds. Designs with a large cylinder radius tend to result in increased heat loss with large surface-to-volume ratio. Accordingly, an engine design that allows for effective high-speed operation and power with low heat loss is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an engine with a first crankshaft extending in a horizontal plane configured to form a first rotating power output shaft of the engine. The engine includes a second crankshaft extending in the horizontal plane where the second crankshaft forms a second rotating power output shaft of the engine. The engine contains pistons and a corresponding piston rod connected to the first or second crankshaft and a piston head with a planar surface configured to distribute forces from a corresponding combustion reaction to the corresponding piston rod. Each cylinder houses a corresponding piston. Each combustion chamber forms a containment boundary for a corresponding combustion reaction. The engine includes at least one fuel injector that injects fuel into the cylinders where the fuel is mixed with air in the cylinders to form an air-fuel mixture that is combusted during the combustion reactions. The cylinders contain an even number of cylinders situated in two parallel banks forming a first bank and a second bank of cylinders. The first crankshaft interconnects pistons in the first bank of cylinders and the second crankshaft interconnects pistons in the second bank of cylinders. The planar surface of the piston head in the first bank of cylinders is disposed at an angle between 7 and 15 degrees and the planar surface of the piston head in the second bank of cylinders is disposed at an angle between −7 and −15 degrees relative to a vertical plane that extends in a direction orthogonal to an extension direction of the horizontal plane.

In another aspect, embodiments disclosed herein relate to a method of connecting pistons to a first crankshaft or a second crankshaft with piston rods, where the first crankshaft and the second crankshaft each extend in a horizontal plane and form a rotating power output shaft of an engine. The method includes housing each piston in a corresponding cylinder where the cylinders form a first bank of cylinders and a second bank of cylinders, where the pistons are interconnected by their respective crankshaft. A planar surface of a piston head of each piston in the first bank of cylinders is positioned at an angle between 7 and 15 degrees and a planar surface of each piston head of each piston in the second bank of cylinders is positioned at an angle between −7 and −15 degrees relative to a vertical plane that extends in a direction orthogonal to an extension direction of the horizontal plane. Fuel is injected using at least one fuel injector into the cylinders, mixed with air in the cylinders to form an air-fuel mixture, and the air-fuel mixture is combusted in a combustion chamber. The combustion chamber forms a containment boundary for a corresponding combustion reaction. The planar surface of the piston head is configured to distribute forces from an associated combustion reaction to a corresponding piston rod.

Any combinations of the various embodiments and implementations disclosed herein can be used in a further embodiment, consistent with the disclosure. Other aspects and advantages of the claimed subject matter will be apparent from the following description and the appended claims.

BRIEF DESCRIPTION OF DRAWINGS

FIG. 5 depicts a table including design parameters for internal combustion engines with two banks of cylinders in accordance with one or more embodiments of the present disclosure.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of this disclosure are related to an engine designed to achieve longer engine strokes with a smaller crankshaft radius for high-speed engine operation with two banks of cylinders. The engine design includes two parallel banks of cylinders angled downwards from the crankshaft side to prevent oil from freely entering the combustion chamber and causing increased unburnt emissions. The effective double stroke from using two banks of cylinders provides for a piston to have a minimum surface area relative to a sweep volume of the combustion chamber. The downward angle further enables the use of traditional poppet valves for intake and exhaust flow. As a result of the angled piston design with two banks of cylinders, the engine achieves a high rotation speed and a lower surface to volume ratio compared to traditional long-stroke single piston engine design. In turn, the increased rotation speed and decreased surface to volume ratio promotes an increase in the power output and thermal efficiency with a reduction in unburnt emissions for the engine.

Figure 1:
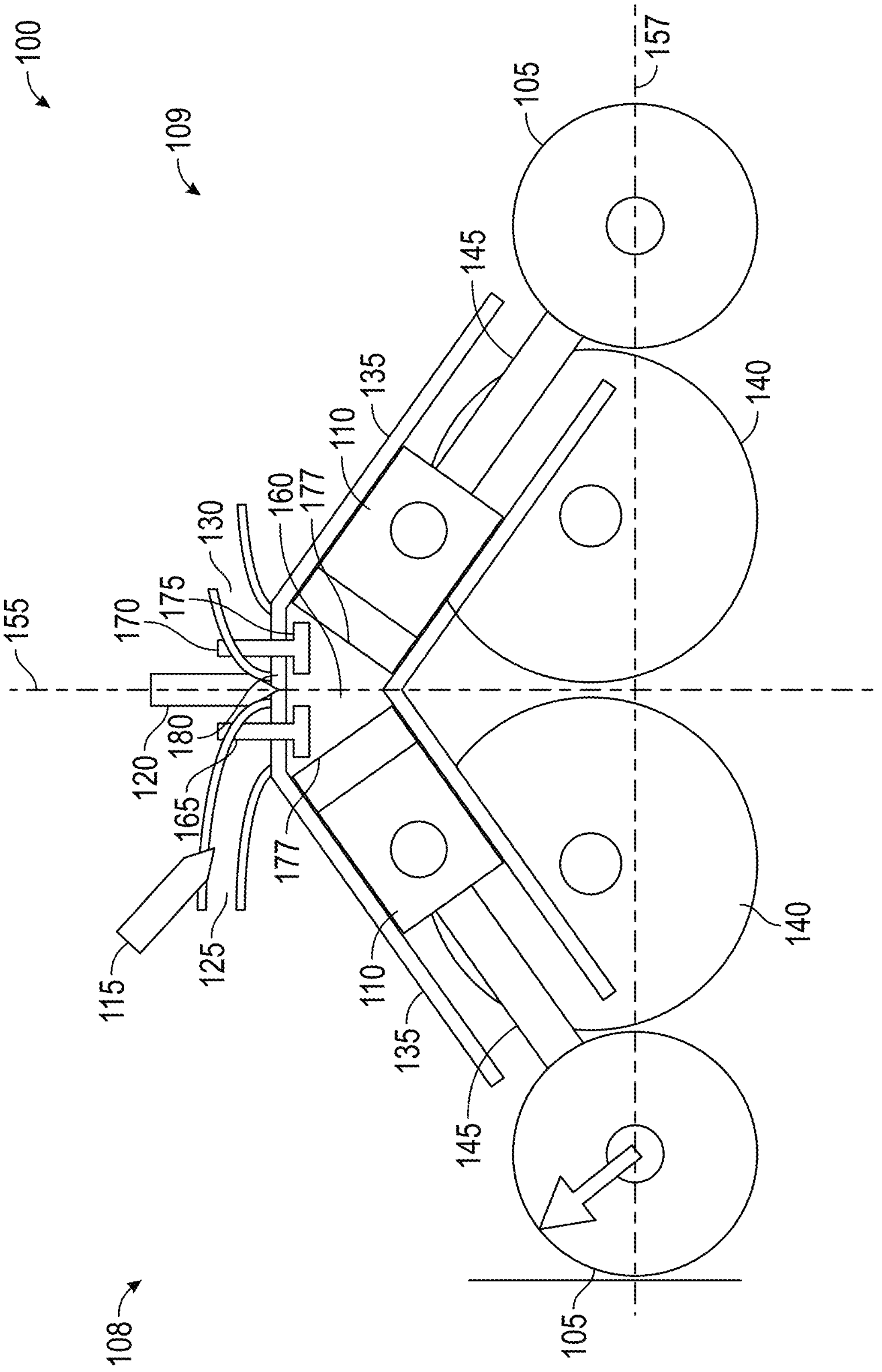
FIG. 1 depicts an internal combustion engine with two banks of cylinders in accordance with one or more embodiments of the present disclosure.

Turning to FIG. 1, FIG. 1 is a diagram of an internal combustion engine 100 with two banks of cylinders 135. The two banks of cylinders are arranged on opposing sides of a vertical plane 155. In FIG. 1, the engine 100 includes a first crankshaft 105 connected to a corresponding first piston 110 by a corresponding first piston rod 145. The corresponding first piston 110 is housed within a first bank 108 of cylinders 135. In a second bank 109 of cylinders 135 disposed on the right hand side of the vertical plane 155, the engine 100 includes a second crankshaft 105 connected to a corresponding piston 110 by a corresponding piston rod 145. Top views of the cylinders 135 in the first bank 108 and the second bank 109 are depicted in FIGS. 2A-2D, below.

Continuing with FIG. 1, each crankshaft 105 forms a rotating power output shaft of the engine 100. Each piston 110 is formed with a substantially cylindrical shape. The first bank 108 of cylinders 135 and the second bank 109 of cylinders 135 are interconnected with a gear 140 disposed in the first bank 108 and a gear 140 disposed in the second bank 109. The gear 140 disposed in the first bank 108 is configured to mesh with a splined end (not shown) of the first crankshaft 105 in the first bank 108 and the gear 140 disposed in the second bank 109 is configured to mesh with a splined end (not shown) of the second crankshaft 105. This arrangement ensures that the two crankshafts 105 are synchronized with different rotational directions at the same output speed. To achieve this, the gears 140 have an equivalent diameter and number of teeth such that these components are substantial duplicates of each other. A combustion chamber 175 is formed between the cylinder 135 in the first bank 108 of cylinders 135 and the cylinder 135 in the second bank 109 of cylinders 135. The combustion chamber 175 forms a containment boundary for a combustion reaction in the combustion chamber 175.

The first bank 108 of cylinders 135 and the second bank 109 of cylinders 135 are positioned at an angle 160 relative to a vertical plane 155, ensuring oil cannot freely enter into the combustion chamber 175 due to gravitational forces. The vertical plane 155 extends in a direction orthogonal to an extension direction of a horizontal plane 157. The first crankshaft 105 in the first bank 108 and the second crankshaft 105 in the second bank 109 primarily extend in the horizontal plane 157. The cylinders 135 in both the first bank 108 and the second bank 109 are positioned at an angle 160 formed between the piston head 177 and the vertical plane 155. The piston head 177 is formed as a planar surface that is configured to distribute forces from a corresponding combustion reaction of a plurality of combustion reactions to the corresponding piston rod 145.

For the first bank 108 of the cylinders 135, the angle 160 is between 7 and 15 degrees relative to the vertical plane 155. For the second bank 109 of cylinders 135, the angle 160 is between −7 and −15 degrees relative to the vertical plane 155. Although the angle 160 may vary overall, each bank of cylinders 135 will have the same angle 160 magnitude, such that only the signed direction of the angle 160 varies between the first bank 108 of cylinders 135 and the second bank 109 of cylinders 135. In this regard, a positive degree measurement implies rotating counterclockwise relative to the vertical plane 155, whereas a negative degree measurement implies rotating clockwise relative to the vertical plane 155. The angle 160 may be adjusted as an engine design parameter depending on the packaging of the engine and the surface to volume ratio of the combustion chamber.

The shape of the combustion chamber 175 is based on the angle of the piston heads and the shape of the cylinder head 180. The shape of the combustion chamber 175 is correlated to the surface area and volume of the combustion chamber 175. For example, a large angle 160 will result in a larger surface area and volume for the combustion chamber 175. The surface area to volume ratio will impact heat loss, as a larger surface area will remove more heat from the combustion chamber and provides less power as it reduces the expansion and pressure of the combustion. Alternatively, a smaller surface area will remove less heat resulting in more power. The angle of the piston heads 177 thus impacts clearance volume and compression ratio design of the engine 100, impacting the performance thereof.

An intake manifold branch 125 is configured to form fluid passageways to provide air to the combustion chamber 175. An exhaust manifold branch 130 is configured to provide a path away from the combustion chamber 175 for exhaust emissions. The intake manifold branch 125 at least partially houses an intake poppet valve 165. The exhaust manifold branch 130 also at least partially houses an exhaust poppet valve 170. The intake poppet valve 165 controls the flow of the intake air-fuel mixture from the intake manifold branch 125 into the combustion chamber 175. The exhaust poppet valve 170 controls the flow of the exhaust gas from the combustion chamber 175 through the exhaust manifold branch 130. The cylinder head 180 is configured to at least partially enclose the plurality of cylinders 135. Thus, the upper portion of the combustion chamber 175 is enclosed and fluidly isolated from the external environment by way of the intake poppet valve 165, the cylinder head 180, and the exhaust poppet valve 170.

The engine 100 may include one of the following fuel injectors: a Port Fuel Injector (PFI) 115 and a Direct Fuel Injector (DFI) 120. In embodiments including a PFI 115, the PFI 115 is positioned upstream of the combustion chamber 175 in an intake manifold (where a branch of the intake manifold is depicted as the intake manifold branch 125), and thus provides fuel injection to all of the intake manifold branches 125 simultaneously. In embodiments containing a DFI 120, each combustion chamber 175 includes a separate DFI 120, such that a plurality of DFIs 120 are situated in the cylinder head 180 depending on the number of combustion chambers 175. For example, in an engine 100 with two cylinders 135 in each of the two banks 108, 109 of cylinders 135, totaling to four cylinders 135 and two combustion chambers 175, there may be two DFIs 120 corresponding to the two combustion chambers 175. Alternatively, in an engine 100 with four cylinders 135 in each of the two banks 108, 109 of cylinders 135, totaling to eight cylinders 135 and four combustion chambers 175, there may be four DFIs 120 corresponding to the four combustion chambers 175. Thus, the number of DFIs 120 depends on the particular engine configuration.

Figure 2D:
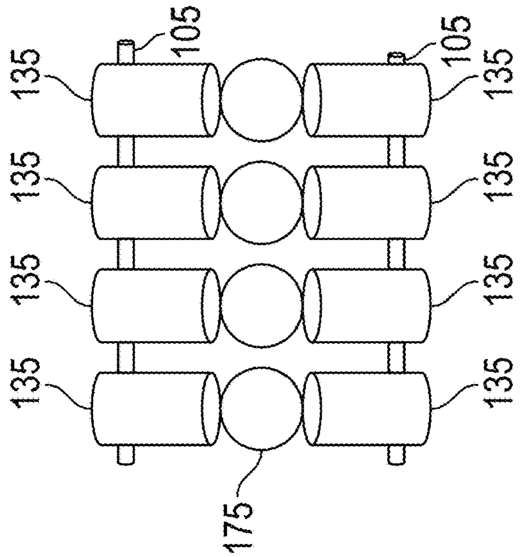
FIGS. 2A-2D depict internal combustion engines with two banks of cylinders in accordance with one or more embodiments of the present disclosure.
Figure 2C:
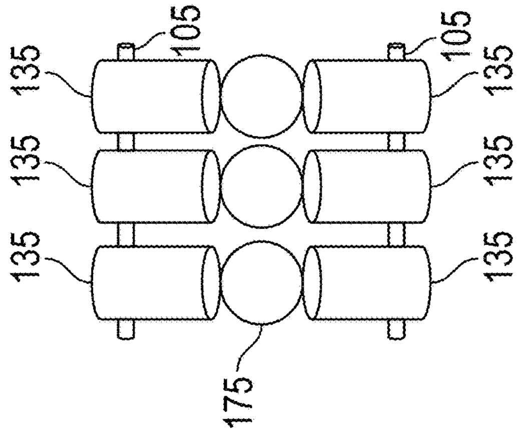
Figure 2B:
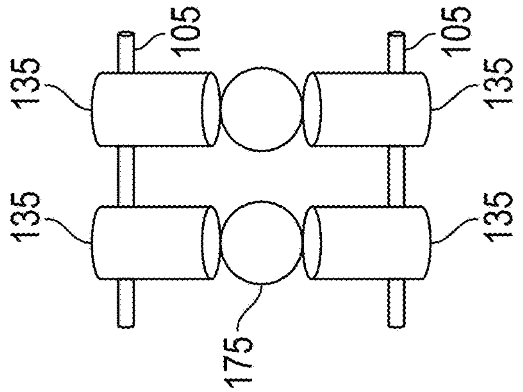
Figure 2A:
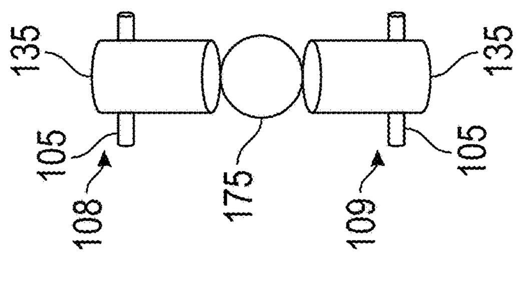

FIGS. 2A-2D illustrate an internal combustion engine 100 with two banks 108, 109 of cylinders 135 and varying numbers of cylinders 135 in each of the two banks 108, 109. In the arrangements with two banks 108, 109 of cylinders 135, there may be a variety of different numbers of cylinders 135 per bank, typically between 1 and 6 cylinders 135 per bank. The total number of cylinders 135 in the engine, which is twice the number of cylinders 135 per bank (i.e., 2 to 12), is thus an even number. In FIG. 2A, an arrangement with one cylinder in each of the two banks 108, 109 of cylinders 135 is shown. A first crankshaft 105 is connected to a corresponding cylinder 135 in the first bank 108. A second crankshaft 207 is connected to a corresponding cylinder 135 in the second bank 109. A combustion chamber 175 is shared between each of the two corresponding cylinders 135.

Turning to FIG. 2B, an arrangement with two cylinders 135 in each of the two banks 108, 109 of cylinders 135 is shown. A first crankshaft 105 is connected to two corresponding cylinders 135 in the first bank 108. A second crankshaft 105 is connected to another two corresponding cylinders 135 in the second bank 109. For each pair of cylinders 135, a combustion chamber 175 of the plurality of combustion chambers is shared between the two cylinders 135. Notably, throughout the disclosure, when the phrase "pair of cylinders 135" is discussed, this refers to a cylinder 135 in a first bank 108 of cylinders 135 and a second cylinder 135 in a second bank 109 of cylinders 135 directly across from the first cylinder 135 in the first bank 108 of cylinders 135.

FIG. 2C shows an arrangement with three cylinders 135 in each of the two banks 108, 109 of cylinders 135. A first crankshaft 105 is connected to three corresponding cylinders 135 in the first bank 108. A second crankshaft 105 is connected to another three corresponding cylinders 135 in the second bank 109. For each pair of cylinders 135, a combustion chamber 175 of the plurality of combustion chambers 175 is shared therebetween. FIG. 2D shows an arrangement with four cylinders 135 in each of the two banks 108, 109 of cylinders 135. A first crankshaft 105 is connected to four corresponding cylinders 135. A second crankshaft 105 is connected to another four of the corresponding cylinders 135. For each pair of cylinders 135, a combustion chamber 175 of the plurality of combustion chambers is shared between the two cylinders 135. Thus, overall, FIGS. 2A-2D depict that the number of cylinders 135, and thus the power output of the engine 100, can be scaled by adding additional cylinders 135 and lengthening the crankshafts 105.

Figure 3:
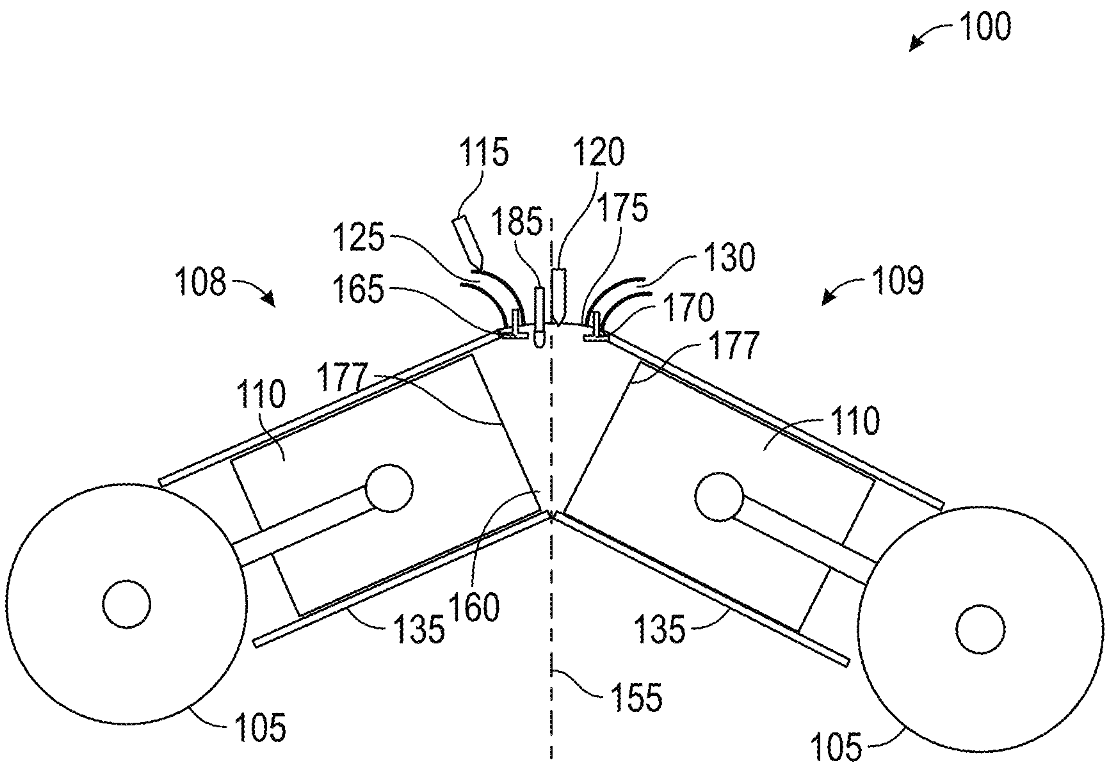
FIG. 3 depicts an internal combustion engine in accordance with one or more embodiments of the present disclosure.

FIG. 3 is a diagram of an internal combustion engine with a rounded combustion chamber shape in an arrangement with two banks 108, 109 of cylinders 135, similar to FIG. 3. With the same components and arrangement as FIG. 1, FIG. 3 illustrates an angle of approximately 15 degrees, resulting in a larger combustion chamber. The surface area of the combustion chamber 175 is approximately 14,936 square millimeters and the surface area to volume ratio is approximately 0.15, compared to the surface area of approximately 12,370 square millimeters and the surface area to volume ratio of 0.24 discussed above. The angle 160 impacts various dimensions, including the overall height of the engine, which is less when the angle is smaller. For example, the height of the center of mass of the combustion chamber 175 is approximately 6.43 millimeters with an angle 160 of 7.5 degrees, while the height of the center of mass of the combustion chamber 175 is approximately 12.63 millimeters with an angle 160 of 15 degrees. As the combustion chambers 175 height decreases in tandem with decreases in the angle 160, the engine design is shorter than typical vertical piston engines while still retaining the oil flow properties thereof.

As discussed above, a larger surface area to volume ratio in the combustion chamber 175 will result in more heat loss and less power, thus the surface area to volume ratio of the combustion chamber is an important factor in the engine design. Notably, though the larger surface area is unfavorable in this way, larger surface area tends to result in less engine knock, so both factors must be balanced. Thus, although a small angle 160 is preferred in situations where engine height should be minimized, a larger angle 160 is preferable for knock control. As a result of this arrangement, the particular angle 160 utilized in an engine 100 in accordance with one or more embodiments of the invention as disclosed herein may vary at an operator's or manufacturer's discretion. In FIG. 3, the angle between the piston head 177 and the vertical plane 155 is approximately 7.5 degrees. The combustion chamber 175 is rounded in such a way that a spherical segment (i.e., a slice of a sphere) completes perimeter of the combustion chamber 175 and the combustion chamber 175 is configured with a semi-spherical form. The surface area of the combustion chamber 175 is approximately 12,370 square millimeters and the surface area to volume ratio is approximately 0.24 in the embodiment depicted in FIG. 3.

Additionally, FIG. 3 illustrates an ignition device 185. Each of the cylinders 135 may have a corresponding ignition device 185 such that the engine 100 has a plurality of ignition devices 185. The plurality of ignition devices 185 may be selected from spark plugs, glow plugs, prechambers, or combinations thereof. While illustrated in FIG. 3, the same ignition device 185 may also be used in the embodiments of FIG. 1.

Figure 4:
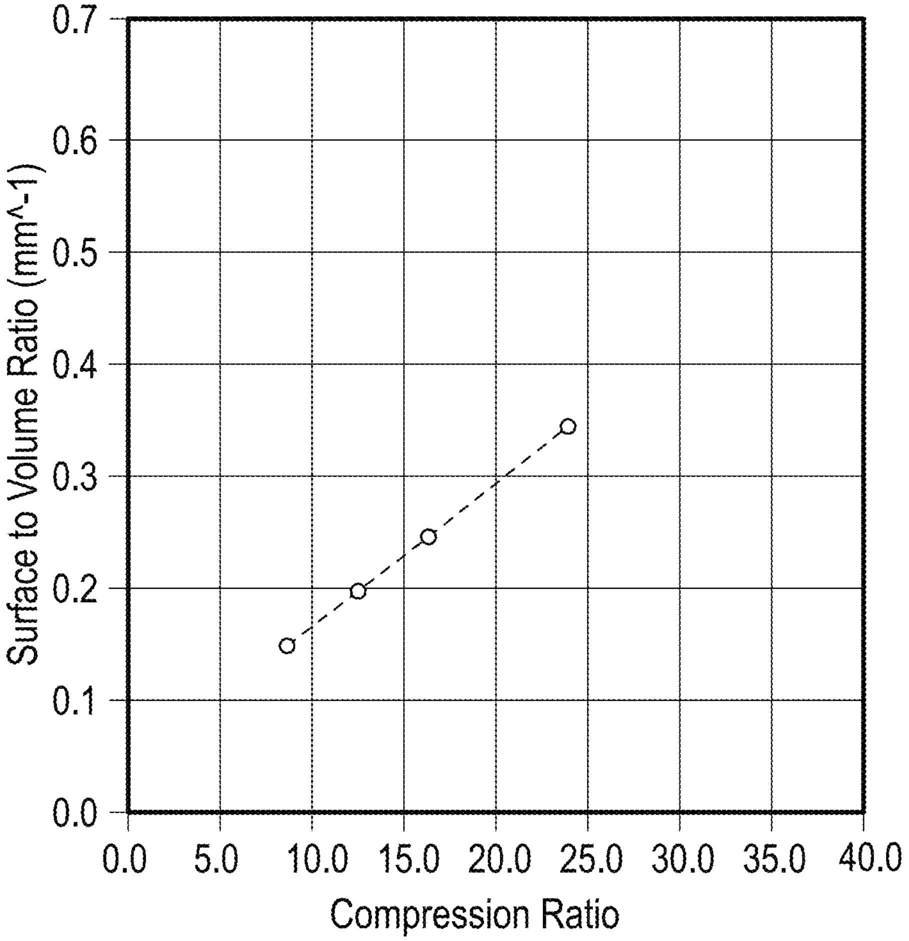
FIG. 4 depicts a graph of surface to volume ratio against compression ratio in accordance with one or more embodiments of the present disclosure.

FIG. 4 is a graph of surface to volume ratio against compression ratio in accordance with one or more embodiments. The surface to volume ratio is the ratio of the surface area of the cylinder head to the volume of the cylinder head, which may impact heat losses at the cylinder wall. In FIG. 4, a line for surface to volume ratio against compression ratio is shown for an engine design with two banks 108, 109 of cylinders 135. As illustrated in the graph, the contemplated engine design has a pseudo-linear relationship between the surface to volume ratio and the compression ratio. As shown in the graph, an engine with two banks of cylinders 135 may have a range of compression ratios between 8.6:1 and 23.9:1 (i.e., a compression ratio between 8.6 and 23.9), inclusive.

FIG. 5 is a table including parameters for an internal combustion engine with two banks of cylinders 135 in accordance with one or more embodiments. Notably, the values for the angle 160 in the table indicate the degree measurement from the top of the piston head 177 and the vertical plane 155. Thus, the degree measurement between each of the piston heads 177 is twice that of the angle 160 provided in the table. The angles 160 vary from 5 to 15 degrees from a piston head to the vertical plane 155, which would be 10 to 30 degrees from a first piston head 177 to a second piston head 177. FIG. 5 shows data for the engine with two banks of cylinders 135, including angle, cylinder diameter, stroke, surface area, clearance volume, displacement volume, compression ratio, surface to volume ratio, and maximum engine speed. This table indicates that the maximum engine speed is 9493 RPM with an individual stroke to bore ratio of 1 for the engine design with two banks of cylinders 135, such that the engine 100 can operate with rotational speeds greater than 9400 RPM. In conjunction with the above discussion of FIG. 4, the engine 100 thus operates at a relatively high compression ratio (i.e., a compression ratio between 8.6 and 23.9) and engine speed (i.e., greater than 9400 RPMs) while having a relatively long stroke length (i.e., 79 mm) compared to typical engine designs.

Figure 6:
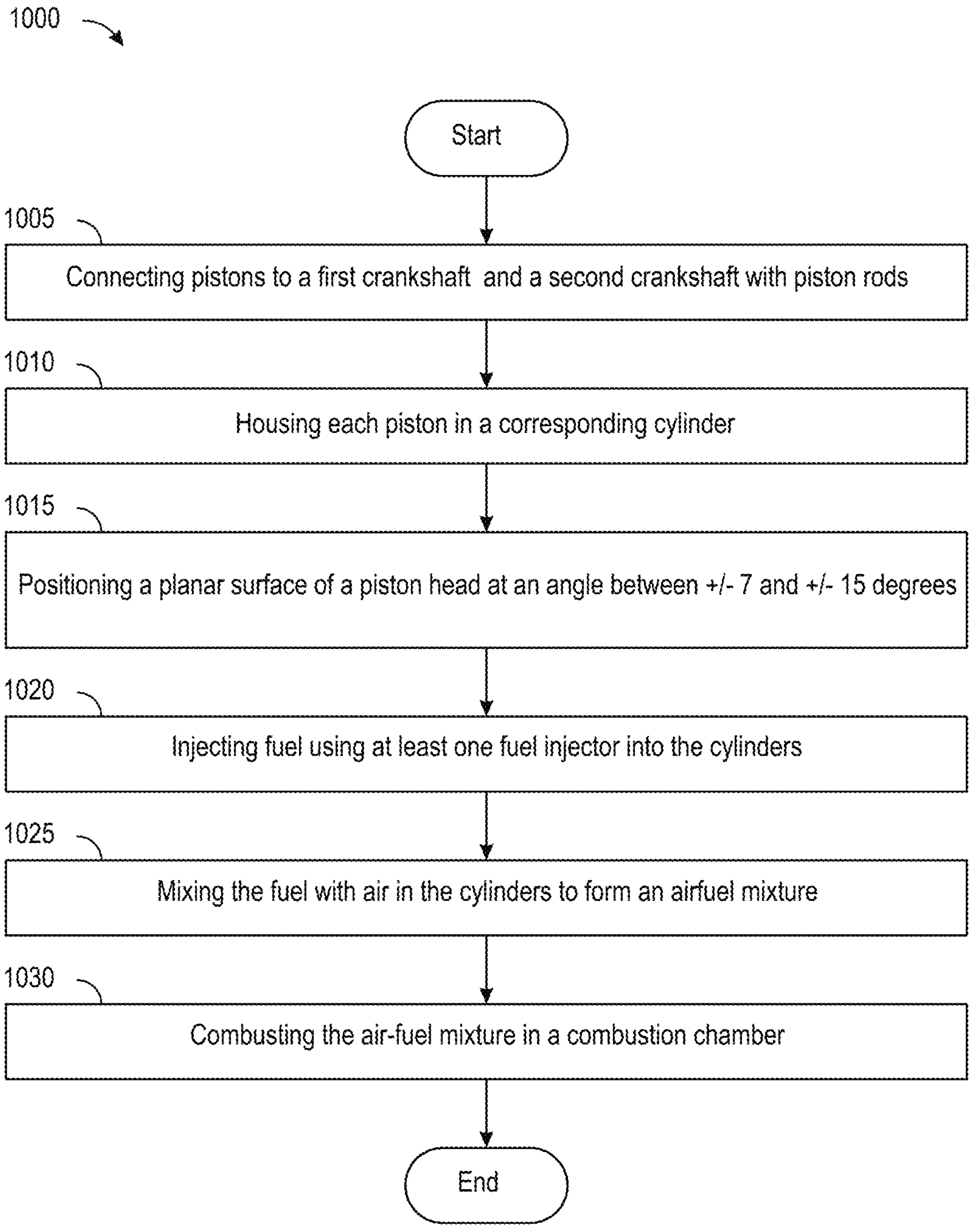
FIG. 6 is a flow diagram of a method in accordance with one or more embodiments of the present disclosure.

FIG. 6 is a flow diagram of a method 1000 in accordance with one or more embodiments. In step 1005, for a plurality of pistons, each piston 110 is connected to either a first crankshaft 105 or a second crankshaft 105 via a piston rod 145 of a plurality of piston rods. Both the first crankshaft 105 and the second crankshaft 105 extend in a horizontal plane 157 and form rotating power output shafts of an engine 100. The piston rods 145 thus connect the displacing pistons 110 to the rotating first crankshaft 105.

In step 1010, each piston 110 is housed within a corresponding cylinder 135 of a plurality of cylinders 135 forming a first bank 108 of cylinders 135 that is interconnected using the first crankshaft 105 and a second bank 109 of cylinders 135 that is interconnected using the second crankshaft 105. As the piston 110 displaces, the cylinder 135 stays stationary such that the piston 110 is actuated within the cylinder 135. The cylinder 135 thus serves to guide the motion of a corresponding piston 110 when the piston 110 actuates.

In step 1015, a planar surface of a piston head 177 of the first bank 108 of cylinders 135 is positioned at an angle 160 between 7 and 15 degrees relative to a vertical plane 155 that extends in a direction orthogonal to an extension direction of the horizontal plane 157. A planar surface of a piston head 177 of the second bank 109 of cylinders 135 is positioned at an angle 160 between −7 and −15 degrees relative to the vertical plane 155 that extends in a direction orthogonal to an extension direction of the horizontal plane 157. The positioning of the head of the piston 110 at an angle 160 impacts the design of the combustion chamber 175, influencing the heat loss, power, and thus overall efficiency of the engine.

In step 1020, fuel is injected using at least one fuel injector into the cylinders 135. As described above, the fuel injector(s) may be a Port Fuel Injector (PFI) 115 or a Direct Fuel Injector (DFI) 120. The PFI 115 is located upstream of the combustion chamber 175 in an intake manifold, where a branch of the intake manifold is depicted as the intake manifold branch 125. The DFI 120 is located in the cylinder head 180.

In step 1025, the fuel that was injected by the fuel injector(s) mixes with air that is disposed in the cylinders 135 to form an air-fuel mixture. The intake manifold branch 125 provides the air to the combustion chamber 175. The mixing is aided by the motion of the piston 110, which naturally creates fluid motion within the combustion chamber 175.

In step 1030, the air-fuel mixture is combusted in each corresponding combustion chamber 175 of the plurality of combustion chambers 175. Each combustion chamber 175 forms a containment boundary for a corresponding combustion reaction of a plurality of combustion reactions. These combustion reactions generate forces that are distributed across the planar surface of the piston head 177 of each piston 110, and the generated force causes the pistons 110 to actuate corresponding piston rods 145. As discussed above, the piston rod 145 connects the displacing pistons 110 to the rotating first crankshaft 105, and thus transfers the forces from the pistons 110 to the first crankshaft 105 to drive its rotation.

Embodiments of the present disclosure may provide at least one of the following advantages. The engine design with two banks of cylinders achieves a longer engine stroke with a smaller crankshaft radius for high-speed engine operation in a space efficient and compact package. This design ensures a high-powered and efficient engine design in a small footprint due to the low heat loss from the decreased surface area to volume ratio.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. An engine, comprising:

a first crankshaft extending in a horizontal plane, where the first crankshaft is configured to form a first rotating power output shaft of the engine;

a second crankshaft extending in the horizontal plane, where the second crankshaft is configured to form a second rotating power output shaft of the engine;

a plurality of pistons, each piston of the plurality of pistons comprising:

a corresponding piston rod connected to the first crankshaft or the second crankshaft, and a piston head comprising a planar surface that is configured to distribute forces from a corresponding combustion reaction of a plurality of combustion reactions to the corresponding piston rod;

a plurality of cylinders, each cylinder of the plurality of cylinders being configured to house a corresponding piston of the plurality of pistons;

a plurality of combustion chambers, each combustion chamber being configured to form a containment boundary for a corresponding combustion reaction of the plurality of combustion reactions;

at least one fuel injector configured to inject fuel into the engine, where the fuel is mixed with air disposed in the plurality of cylinders to form an air-fuel mixture that is combusted during the plurality of combustion reactions;

wherein the plurality of cylinders comprises an even number of cylinders situated in two parallel banks, forming a first bank of cylinders and a second bank of cylinders;

wherein the first crankshaft interconnects pistons disposed in the first bank of cylinders and the second crankshaft interconnects pistons disposed in the second bank of cylinders;

wherein the planar surface of the piston head in the first bank of cylinders is disposed at an angle between 7 and 15 degrees, inclusive, and the planar surface of the piston head in the second bank of cylinders is disposed at an angle between −7 and −15 degrees, inclusive, relative to a vertical plane that extends in a direction orthogonal to an extension direction of the horizontal plane, wherein a maximum engine speed of the engine is greater than 9400 RPM, wherein each piston actuates with a stroke length greater than 75 millimeters, wherein a ratio of a length of each piston rod to a diameter of each combustion chamber has a value greater than or equal to 1, and wherein the engine operates with a maximum compression ratio of 23.9.

2. The engine of claim 1, further comprising an intake manifold branch configured to form a plurality of fluid passageways that distribute the air to the plurality of cylinders, wherein the at least one fuel injector is a Port Fuel Injector (PFI) that is configured to provide the fuel to the intake manifold branch.

3. The engine of claim 1, further comprising: a plurality of ignition devices selected from spark plugs, glow plugs, prechambers, or combinations thereof, configured to initiate the plurality of combustion reactions by generating ignition in the plurality of combustion chambers.

4. The engine of claim 1, further comprising: an intake poppet valve at least partially disposed in an intake manifold branch configured to control and provide air to the plurality of cylinders.

5. The engine of claim 1, further comprising: an exhaust poppet valve at least partially disposed in an exhaust manifold branch configured to control and divert exhaust gas away from the plurality of cylinders.

6. The engine of claim 1, wherein the at least one fuel injector comprises a plurality of Direct Fuel Injectors (DFI), where each DFI of the plurality of DFIs is configured to inject the fuel into a corresponding combustion chamber.

7. The engine of claim 1, wherein a cylinder head, configured to at least partially enclose the plurality of cylinders, is configured with a semi-spherical form.

8. The engine of claim 1, wherein the engine operates with a compression ratio having a value between 8.6 to 23.9, inclusive.

9. The engine of claim 1, further comprising: a first gear configured to mesh to the first crankshaft, and a second gear configured to mesh to the second crankshaft, wherein the first crankshaft and the second crankshaft are rotating such that the first crankshaft and the second crankshaft rotate at a same output speed.

10. A method, comprising:

connecting a plurality of pistons to a first crankshaft or a second crankshaft with a plurality of piston rods, where the first crankshaft and the second crankshaft each extend in a horizontal plane and each form a rotating power output shaft of an engine;

housing each piston of the plurality of pistons in a corresponding cylinder of a plurality of cylinders, where the plurality of cylinders are disposed forming a first bank of cylinders and a second bank of cylinders, and the pistons are interconnected by their respective crankshaft;

positioning a planar surface of a piston head of each piston in the first bank of cylinders at an angle between 7 and 15 degrees, inclusive, and the planar surface of the piston head of each piston in the second bank of cylinders at an angle between −7 and −15 degrees, inclusive, relative to a vertical plane that extends in a direction orthogonal to an extension direction of the horizontal plane;

injecting fuel using at least one fuel injector into the engine;

mixing the fuel with air disposed in the plurality of cylinders to form an air-fuel mixture;

combusting the air-fuel mixture in a corresponding combustion chamber of a plurality of combustion chambers, where each combustion chamber forms a containment boundary for a corresponding combustion reaction of a plurality of combustion reactions; and operating the engine with:

a maximum engine speed greater than 9400 RPM;

a stroke length for each piston greater than 75 millimeters;

a ratio of a length of each piston rod to a diameter of each combustion chamber greater than or equal to 1;

a maximum compression ratio of 23.9;

wherein the planar surface of the piston head of each piston is configured to distribute forces from an associated combustion reaction of the plurality of combustion reactions to a corresponding piston rod.

11. The method of claim 10, further comprising distributing the air-fuel mixture to the plurality of cylinders with a Port Fuel Injector (PFI) in an intake manifold branch, wherein an intake poppet valve is disposed in the intake manifold branch and the intake manifold branch is in fluid communication with the plurality of cylinders.

12. The method of claim 10, further comprising initiating the plurality of combustion reactions of the air-fuel mixture using a plurality of ignition devices selected from spark plugs, glow plugs, prechambers, or combinations thereof in the plurality of combustion chambers.

13. The method of claim 10, further comprising controlling the air provided to the plurality of cylinders using an intake poppet valve at least partially disposed in an intake manifold branch.

14. The method of claim 10, further comprising controlling exhaust gas exiting the plurality of cylinders using an exhaust poppet valve at least partially disposed in an exhaust manifold branch.

15. The method of claim 10, wherein the at least one fuel injector injecting fuel into the plurality of cylinders is a plurality of Direct Fuel Injectors (DFI), and each DFI of the plurality of DFIs is configured to inject the fuel into a corresponding combustion chamber.

16. The method of claim 10, further comprising operating the engine with a compression ratio having a value between 8.6 to 23.9, inclusive.

* * * * *